United States Patent
Dimond et al.

(10) Patent No.: US 11,467,960 B1
(45) Date of Patent: Oct. 11, 2022

(54) ACCESS FREQUENCY CACHING HARDWARE STRUCTURE

(71) Applicant: Arm Limited, Cambridge (GB)

(72) Inventors: Robert Gwilym Dimond, Cambridge (GB); Matthew Lucien Evans, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/377,873

(22) Filed: Jul. 16, 2021

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

2010/0076805 A1\* 3/2010 Batsakis ............. H04L 67/1097
705/26.1

OTHER PUBLICATIONS

Agarwal et al., "Thermostat: Application-transparent Page Management for Two-tiered Main Memory", ASPLOS ' 17, Apr. 8-12, 2017, 14 pages.

\* cited by examiner

*Primary Examiner* — Jae U Yu
(74) *Attorney, Agent, or Firm* — Nixon & Vanderhye P.C.

(57) ABSTRACT

An access frequency caching hardware structure has entries each storing an access frequency counter indicative of a frequency of accesses to a corresponding page of a memory address space. Access frequency tracking circuitry is responsive to a given memory access request requesting access to a target page, to determine whether the access frequency caching hardware structure already includes a corresponding entry which is valid and corresponds to the target page. When the structure includes the corresponding entry, a corresponding access frequency counter specified by the corresponding entry is incremented. In response to a counter writeback event associated with a selected access frequency counter corresponding to a selected page, an update is made to a global access frequency counter corresponding to the selected page within a global access frequency tracking data structure stored in the memory system.

20 Claims, 4 Drawing Sheets

ACCESS FREQUENCY CACHING HARDWARE STRUCTURE

BACKGROUND

Technical Field

The present technique relates to the field of data processing.

Technical Background

In a data processing system, it can be useful to provide a mechanism for tracking the relative frequency with which respective pages of a memory address space are accessed. This can be useful, for example, for determining how virtual addresses should be mapped to physical addresses, as the access frequency tracking information can be used to identify more frequently accessed pages of the address space which may be mapped to portions of the memory system which can be accessed faster, with less frequently accessed pages being allocated to portions of the memory system which are slower to access.

SUMMARY

At least some examples provide an apparatus comprising: memory access circuitry to process memory access requests requesting access to a memory system; an access frequency caching hardware structure, comprising a plurality of entries each to store an access frequency counter indicative of a frequency of accesses to a corresponding page of a memory address space; and access frequency tracking circuitry responsive to a given memory access request requesting access to a target page of a memory address space, to: determine whether the access frequency caching hardware structure already includes a corresponding entry which is valid and corresponds to the target page; and when the access frequency caching hardware structure already includes the corresponding entry, increment a corresponding access frequency counter specified by the corresponding entry; in which: in response to a counter writeback event associated with a selected access frequency counter corresponding to a selected page of the memory address space, the access frequency tracking circuitry is configured to cause at least one memory access request to be issued to the memory system to request an update to a global access frequency counter corresponding to the selected page within a global access frequency tracking data structure stored in the memory system.

At least some examples provide a method for tracking frequency of access to one or more pages of a memory address space, the method comprising: in response to a given memory access request requesting access to a target page of the memory address space: determining whether a corresponding entry which is valid and corresponds to the target page is present in an access frequency caching hardware structure comprising a plurality of entries each to store an access frequency counter indicative of a frequency of accesses to a corresponding page of a memory address space; and when the access frequency caching hardware structure already includes the corresponding entry, incrementing a corresponding access frequency counter specified by the corresponding entry; and in response to a counter writeback event associated with a selected access frequency counter corresponding to a selected page of the memory address space, issuing at least one memory access request to the memory system to request an update to a global access frequency counter corresponding to the selected page within a global access frequency tracking data structure stored in the memory system.

At least some examples provide a non-transitory computer-readable medium to store computer-readable code for fabrication of an apparatus comprising: memory access circuitry to process memory access requests requesting access to a memory system; an access frequency caching hardware structure, comprising a plurality of entries each to store an access frequency counter indicative of a frequency of accesses to a corresponding page of a memory address space; and access frequency tracking circuitry responsive to a given memory access request requesting access to a target page of a memory address space, to: determine whether the access frequency caching hardware structure already includes a corresponding entry which is valid and corresponds to the target page; and when the access frequency caching hardware structure already includes the corresponding entry, increment a corresponding access frequency counter specified by the corresponding entry; in which: in response to a counter writeback event associated with a selected access frequency counter corresponding to a selected page of the memory address space, the access frequency tracking circuitry is configured to cause at least one memory access request to be issued to the memory system to request an update to a global access frequency counter corresponding to the selected page within a global access frequency tracking data structure stored in the memory system.

Further aspects, features and advantages of the present technique will be apparent from the following description of examples, which is to be read in conjunction with the accompanying drawings.

DESCRIPTION OF EXAMPLES

One approach for profiling frequency of access to memory at a page level may be for system software to set up the page tables (that control address translation and indicate access permissions for accessing each page of the address space) so that the permissions are set to indicate that accesses to a given page generate a fault. When the fault is generated on accessing the given page, the fault handler executed in software can maintain a counter in a software-managed data structure stored in the memory system. However, the performance overhead of such faults is high and so often this approach may make it infeasible to monitor a large number of pages at the same time, and so in practice only a subset of pages may be monitored to give a statistical profile of page accesses over time, limiting the accuracy achievable. Nevertheless, the runtime performance cost of this approach can be significant.

Another approach may be that hardware in some processor architectures may allow an access flag to be maintained (e.g. using a flag in each page table entry) without needing a software handler to respond to a fault. However, the flag only gives an indication of whether the page has been accessed at all or has never been accessed. Tracking how many times a page has been accessed may therefore require resetting and polling the flag at a given time interval. In each time interval, system software can identify pages which have been accessed within that time interval, and by repeating this operation over a number of time intervals the software can maintain a count of the number of time intervals in which the page was identified as accessed, allowing more frequently accessed pages to be identified by the software. However, again this incurs a runtime overhead in performance due to periodic polling of the flag and software maintenance of the count structure in memory.

The inventors have recognized that for some purposes it may be useful to be able to distinguish pages accessed a very large number of times from pages accessed a smaller number of times (e.g. to distinguish a page accessed in the order of 100-1000 times per second from those accessed in the order of ~1 million times per second). For example, in a data processing apparatus having a non-uniform memory system including memory devices with different access latencies, it may be desirable to identify the most frequency accessed pages to allow those to be mapped to memory devices with lower access latency than less frequently accessed pages.

However, with the approaches discussed above the runtime overhead for tracking the number of accesses over this range of frequencies would be unfeasibly high. Hence, typical access frequency tracking schemes generates less accurate results which are unable to distinguish the frequency of access across several ranges of magnitude desired for purposes such as non-uniform memory management.

In the examples discussed below, an apparatus has memory access circuitry to process memory access requests requesting access to a memory system, and an access frequency caching hardware structure, which comprises a number of entries each for storing an access frequency counter indicative of a frequency of accesses to a corresponding page of a memory address space. Access frequency tracking circuitry is responsive to a given memory access request requesting access to a target page of a memory address space, to determine whether the access frequency caching hardware structure already includes a corresponding entry which is valid and corresponds to the target page; and when the access frequency caching hardware structure already includes the corresponding entry, increment a corresponding access frequency counter specified by the corresponding entry. When a counter writeback event occurs which is associated with a selected access frequency counter corresponding to a selected page of the memory address space, the access frequency tracking circuitry causes at least one memory access request to be issued to the memory system to request an update of a global access frequency counter corresponding to the selected page within a global access frequency tracking data structure stored in the memory. For example, the at least one memory access request could be an atomic read/modify/write operation as mentioned further below.

Hence, a caching structure is provided in hardware which maintains access frequency counters for a certain subset of pages, but it is backed by an underlying data structure in the memory system (called the "global access frequency data tracking structure") so that access frequency counters for a larger set of pages can be maintained in memory. By providing the access frequency caching hardware structure and the access frequency tracking circuitry, for accesses to a page for which there is a corresponding entry in the access frequency caching hardware structure, there is no need to write to the global access frequency tracking data structure in memory, or to trigger a fault to cause software to write to such a memory-based structure. Therefore, the memory bandwidth and performance cost associated with maintaining the access frequency tracking information can be greatly reduced. Nevertheless, by backing the access frequency caching hardware structure with an underlying data structures stored in the memory system this avoids the hardware limitations to the capacity of the access frequency caching hardware structure placing a limitation on the overall number of pages for which access frequency tracking information can ultimately be maintained. The writeback of counters to the global access frequency tracking data structure by the access frequency tracking circuitry may be performed in hardware to avoid needing software intervention in response to a fault as in the alternative techniques described earlier.

When the access frequency caching hardware structure does not already include the corresponding entry, the access frequency tracking circuitry may allocate to the access frequency caching hardware structure a new entry corresponding to the target page. For example, an invalid entry of the access frequency caching hardware structure may be selected for allocation as the new entry, or if there is no invalid entry available that can be allocated for the target page (taking into account the associativity of the access frequency caching hardware structure—in some schemes only a limited set of entries may be allocated for a given target page), then an existing valid entry can be selected as a victim entry to be evicted (e.g. triggering a counter writeback event for that entry's counter) and the new entry allocated to the victim entry. A replacement policy may be applied to determine which entry should be selected as the victim entry (e.g. least recently used, round robin, random, etc.). Hence, by managing allocation of new entries and replacement of existing entries in hardware using the access frequency caching hardware structure, the hardware can adapt which pages of the address space have entries allocated in the access frequency caching hardware structure, to increase the likelihood that on an access to a given page in memory the hardware structure includes a corresponding entry.

In some examples, the access frequency caching hardware structure could be a dedicated structure provided solely for the purpose of access frequency tracking, which is not shared with other purposes.

However, in other examples the access frequency caching hardware structure may be a shared structure which also provides other information, in addition to the access frequency counter.

For example, the access frequency caching hardware structure may be a translation lookaside buffer (TLB) and the entries may be translation lookaside buffer entries which each store, in addition to the access frequency counter, address translation information associated with the corresponding page. For example, the access frequency caching hardware structure may be combined with the existing TLB functionality which may already be provided in typical processing systems for speeding up address translations. This reduces the additional circuit area and power overhead of implementing the access frequency caching hardware structure and access frequency tracking circuitry, as it may reuse some functions already been provided to support address translation (such as lookup circuit logic for looking up the storage structure, and replacement policy storage for storing replacement policy information for controlling victim selection when an entry of the TLB needs to be replaced). In typical processor systems, the TLB structure may already have been sized to have a sufficient number of entries to provide a relatively high hit rate so as to reduce the number of times when a performance-intensive page table walk operation is needed to obtain address translation information from page tables stored in memory. Therefore, in practice there may be a relatively high chance of a target address for a given memory access request hitting in the TLB, and so by extending each TLB entry to also specify an access frequency counter this may make it relatively unlikely that the target page being accessed does not have a corresponding entry in the access frequency caching hardware structure, greatly reducing the number of times when accesses to memory are needed for the access frequency counter maintenance and therefore increasing performance.

The access frequency counter in each entry of the access frequency caching hardware structure may comprise multiple bits, so that the counter has an encoding capable of distinguishing a first frequency of accesses greater than zero from a second frequency of accesses greater than zero. Hence, the counter does not merely distinguish pages which have never been accessed from pages accessed at least once, but can also distinguish different relative frequencies of accesses among pages which have each been accessed at least once. This can provide more useful information for the purpose of managing page mappings onto a non-uniform memory system for example.

It is not essential for every memory access to trigger an update of a counter in the access frequency caching hardware structure. In some examples the access frequency tracking circuitry may filter which memory access requests trigger incrementing of the corresponding access frequency counter, based on at least one filter criteria. Software may be able to configure whether any filtering is to be applied to determine whether a given memory access should trigger incrementing of a corresponding access frequency counter, and if so, which filter criteria should be applied. Examples of filter criteria that could be selected may include:

A criterion based on the type of memory access (e.g. whether the access is a read access or a write access).

An address-based filter criterion, which depends on the target address specified by a given memory access request (for example, the filter criterion may be whether the target address is within one or more ranges defined by the software, for which accesses to addresses in those ranges should trigger incrementing of the access frequency counter).

A context-based filter criterion, which depends on context information associated with the memory access requests, where context information is indicative of which software process issued the access request. For example, a memory access request may specify an address space identifier (ASID) which may be used to distinguish different address translation regimes associated with different software processes. Similarly, in systems supporting virtualisation, different guest operating systems may be associated with a virtual machine identifier (VMID) allowing processes having the same ASID in different virtual machines to be distinguished from one another. Hence, in some cases the filter criterion may be based on whether the ASID and/or VMID meets certain conditions, so that the software may specify that memory access frequency tracking is only required for certain software processes, to reduce the tracking overhead.

A filter criterion based on the level of the cache/memory hierarchy at which the memory access request hits. For example, a filter criterion may be applied, specifying that counter increments should be performed in response to memory access requests which miss in a certain level of the memory hierarchy (e.g. within the level 2 cache for instance), but can be omitted for memory access requests which hit at that level of the memory hierarchy or higher (e.g. requests which hit in level 1 or level 2 cache). This may recognise that for accesses to pages where the cache hit rate is relatively high in a cache sufficiently close to the processor core (such as level 1 or level 2), the mapping of that page to the underlying non-uniform memory system may not impact on performance as much as for mappings used for pages which miss more frequently in the higher levels of cache causing more frequent accesses to main memory. Therefore, in some cases, software could configure the access frequency tracking circuitry to apply a filter condition which checks the level of the memory hierarchy (including any caches) at which a given memory access is serviced and then makes a determination based on the level of the memory hierarchy at which the access is serviced, to determine whether to increment a corresponding access frequency counter in the access frequency tracking circuitry.

On a writeback of a selected access frequency counter to the global access frequency data structure, the update global access frequency counter may comprise incrementing the global access frequency counter by an increment amount. The increment amount may depend on a value of the selected access frequency counter. For example, the value of the selected access frequency counter could be added to the current value of the global access frequency counter prior to the writeback, to generate a new value for the global access frequency counter which corresponds to the sum of the old value of the global access frequency counter and the value of the selected access frequency counter written back from the access frequency caching hardware structure.

This writeback behaviour may differ from conventional writebacks of data from a cache to memory, where one would expect that the written back value from the cache would replace the value previously stored in memory for the corresponding address, rather than being added to the previous value or triggering an increment of the previous value. By applying an increment to the global access frequency counter based on the selected access frequency counter on a writeback event, this means that the selected access frequency counter within the access frequency caching hardware structure may act as a local count of memory accesses seen for a given page for a particular source of memory access request, making it possible to have multiple sources of memory access requests each maintaining their local count while sharing a shared local access frequency count structure, without needing complex coherency operations between the local counts in the respective access frequency caching hardware structures of those multiple sources. There is no need for the local access frequency counter within the access frequency caching hardware structure of one source of memory accesses to be maintained consistent with the local counter within the caching hardware structure of another source of memory accesses. This is because on a writeback the counter is used to increment the global access frequency counter rather than overwrite it. Hence, this approach can greatly reduce the coherency cost compared to data caching.

When a counter writeback event occurs, then in addition to updating the global access frequency counter for the selected page within the global access frequency tracking data structure stored in the memory system, the access frequency tracking circuitry may also reset the selected access frequency counter stored in the access frequency caching hardware structure to a reset value (the selected access frequency counter may remain valid after being reset). Again, this contrasts with regular data caching where on a writeback the data may either remain the same in the cache or may be invalidated, rather than remaining valid but being reset to a reset value.

In some examples, the selected access frequency counter may have fewer bits than the global access frequency counter. This can reduce the storage size required for the access frequency caching hardware structure.

One example of a counter writeback event could be the selected access frequency counter overflowing or reaching a predetermined threshold value. This can be particularly useful if the local counter in the global access frequency counter has fewer bits than the global counter stored in memory.

Another example of a counter writeback event may be eviction of an entry corresponding to the selected page from the access frequency caching hardware structure. For example when a new entry is to be allocated to the access frequency caching hardware structure for a target page being accessed by the given memory access request, if there is not an invalid entry that can be allocated as the new entry then an existing entry may need to be evicted and in this case the access frequency counter associated with the evicted entry can be written back to update the corresponding global access frequency counter in the memory system.

In another example, the access frequency tracking circuitry may trigger periodic writebacks of multiple counters to the memory system, even if those counters are not overflowing or needing to be evicted from the access frequency caching hardware structure. Hence, in response to elapse of a predetermined period, the access frequency tracking circuitry can trigger the counter writeback event associated with a plurality of access frequency counters stored in the access frequency caching hardware structure. In some cases when the predetermined period elapses, counter writeback events may be triggered for all the valid access frequency counters stored within the access frequency caching hardware structure, to update the corresponding global access frequency counters within the data structure stored in the memory system. Alternatively, a period could be defined for triggering periodic writeback of a certain subset of counters, e.g. counters in entries which meet a certain criterion (e.g. entries associated with a particular context or with addresses in a certain range). In that case, the elapse of the period may trigger only some counters to be written back.

Either way, the period which governs the frequency of occurrence of such counter writeback events could be defined in different ways, for example by counting how many memory accesses have been encountered and triggering the writeback event after a certain number of memory accesses, counting the number of instructions executed by processing circuitry and triggering the writeback event after a certain number of instructions have been executed, or counting the number of clock cycles which have elapsed and triggering the counter writeback event for the multiple access frequency counters after a certain number of clock cycles have elapsed. Regardless of how the period is defined, it can be useful to trigger periodic counter writeback events regardless of whether counters have overflowed or evicted, so that the global access frequency tracking data can be maintained relatively up to date so that if software chooses to read the data structure in the memory system then they can gain a relatively current view of the relative frequency access to different pages.

Another approach could be that the counter writeback event could be the execution of an access frequency count writeback instruction. Hence, some processor architectures may support a dedicated type of instruction which software can choose to execute to trigger access frequency counter writebacks. In some cases, when the access frequency count writeback instruction is executed then this may trigger the counter writeback event for each valid access frequency counter stored in the access frequency caching hardware structure. However, it is also possible for the access frequency count writeback instruction to specify at least one filter criterion, so that in response to execution of the access frequency count writeback instruction, the access frequency tracking circuitry may trigger the counter writeback event associated with one or more access frequency counters for which the at least one filter criterion is satisfied. For example the at least one filter criterion for determining whether to writeback the counter for a given page may be based on the address of the given page (e.g. defining either a single address or an address range for which counters should be written back, which could be defined either in terms of virtual address or in terms of physical address), and/or could be based on context information such as the ASID and/or VMID as mentioned above. Regardless of how the filter criterion are defined (or whether filtering is supported at all), supporting an instruction which can be executed to trigger counter writebacks can be useful to allow software to ensure that prior to reading the global access frequency tracking data structure from the memory system, any local counts resident within the access frequency caching hardware are written back to memory so that when software reads the memory-based structure, the software can gain a more up to date view of the relative frequency of access to a particular page.

The techniques discussed above can be useful in systems where there is only a single source of memory access requests which makes use of the access frequency caching hardware structure. Even in that scenario, the use of a caching structure in hardware in combination with a backing data structure stored in memory can be useful to improve performance while allowing frequency counters for a greater number of pages to be maintained not constrained by the capacity of the access frequency caching hardware structure.

However, the provision of access frequency caching hardware structures in combination with a backing structure in memory for access frequency tracking can be useful in systems having multiple sources of memory accesses sharing access to the memory system. In this case at least two of the sources in memory accesses may have the memory access circuitry, the access frequency caching hardware structure and the access frequency tracking circuitry (it is not essential for every source of memory accesses to have the access frequency caching hardware structure and access frequency tracking circuitry). The at least two sources of memory accesses may each update the shared global access frequency tracking data structure stored in the memory system, based on the access frequency counters stored in the respective access frequency caching hardware structure of each of the at least two sources. In this case, software can gain a global view of the relative frequency of accesses to a given page from the multiple sources across the system as a whole by reading counters from the shared global access frequency tracking data structure.

In some examples, when the target page of a given memory access request hits in the access frequency caching hardware structure so that there is a corresponding entry (and if filtering is being applied, the memory access request also meets any filter criteria), then the corresponding access frequency counter could always be incremented, so that the counter value may correspond to the number of times the page was accessed when any filter criteria were met.

However, in other examples even when the address of the target page hits in the access frequency caching hardware structure and any filter criteria being applied are satisfied, the access frequency tracking circuitry could nevertheless sometimes choose not to update the corresponding access frequency counter in the corresponding entry of the access frequency caching hardware structure. For example, this could be useful to apply a statistical approach to update the corresponding access frequency counter only on a fraction of accesses to a given page to reduce the size of the counter needed to track a given effective number of accesses.

Hence, in some examples in response to the given memory access request, when the access frequency caching hardware structure already includes the corresponding entry, the access frequency tracking circuitry is configured to: determine an outcome of a chance-dependent test, where the outcome of the chance-dependent test, when determined for the given memory access request, is dependent on chance; when the outcome of the chance-dependent test is a first outcome, increment the corresponding access frequency counter; and when the outcome of the chance-dependent test is an outcome other than the first outcome, omit incrementing of the corresponding access frequency counter.

With this approach, rather than updating an access frequency tracking indicator every time there is an access to the corresponding page, the update to the access frequency tracking indicator is only updated some of the time, depending on whether a chance-dependent test provides a first outcome or another outcome. The chance-dependent test may be analogous to a dice roll or a lottery draw, providing a certain probability of having the first outcome where it is a matter of chance whether the first outcome will occur for any given instance of a memory access request. Even if two memory access requests are controlled based on identical memory access control parameters (e.g. same target address, same type of memory access, same permissions set in a page table entry, same execution mode or operating state of the processor at the time of issuing the memory access requests, and the same control settings set in any control registers for configuring the way in which memory access requests are processed, etc.) then the chance-dependent test may nevertheless provide the first outcome for one of those requests and provide a different outcome for another of those requests.

Hence, whether the chance-dependent test provides the first outcome, and therefore whether the corresponding access frequency counter is updated, depends on chance. One may see this as counter-intuitive since this could lead to increased inaccuracy in the access frequency tracking since it would be possible for the chance-dependent test to yield the first outcome on the very first access to a given page that had never been accessed before, but provide another outcome every time a more frequently accessed page is accessed, so it may mean that the local/global counters may identify some pages as accessed more frequently than they really were. However, the inventors recognised that, statistically, compared to less frequency accessed pages, the more frequently accessed pages are more likely to encounter an instance when the chance-dependent test yields the first outcome. Effectively the more frequently accessed pages are given a larger number of "rolls of the dice" compared to less frequently accessed pages, and so the probability is higher that eventually the more frequently accessed page will have its access frequency counter updated. Hence, occasional false positives are unlikely to skew the counters provided by the access frequency caching hardware structure and/or global access frequency tracking data structure by a significant amount.

An advantage of using the chance-dependent test to control whether the access frequency counter is updated for an accessed page is that this allows the circuit area, power and performance cost to be reduced, even if the aim is to track page access frequency over a wide range of orders of magnitude of numbers of accesses. By implementing a chance-dependent test so that the probability of the counter being updated is reduced for any particular memory access to a given page, this means that a smaller counter can be employed while simulating counting over a larger absolute range of access frequency. This allows useful information on the approximate relative frequency of access for different pages to be tracked with much less cost in terms of circuit area, power and performance.

The chance-dependent test can be implemented in various ways. The chance-dependent test may have a probability of less than 1 of providing the first outcome. The chance-dependent test may depend on information or a signal which is not controllable by software which causes the given memory access request to be issued. In some cases, issuing exactly the same memory access request on different occasions may lead to different outcomes of the chance-dependent test, even if all properties of the memory access request and any software-defined parameters for controlling whether the memory access request can be allowed are identical.

In one specific example (not the only example) the chance-dependent test comprises determining whether a test evaluating counter, provided for counting memory access requests, satisfies a predetermined condition. The test evaluating counter is a different counter from the access frequency counter. The test evaluating counter can be any piece of information that has a number of states and is advanced from state to state in response to each memory access request which meets at least one criterion for advancing the counter, and which may be determined to satisfy the predetermined condition once the test evaluating counter has been advanced in state a certain number of times after being reset to an initial state. For example, the test evaluating counter could be a binary integer which is incremented or decremented each time a relevant memory access request is encountered and which may be considered to satisfy the predetermined condition once the test evaluating counter reaches a predetermined value or passes a given threshold. However, it is not essential for counters to be represented as binary integers, and another example could provide a shift register which is shifted to its next state in response to each memory access request meeting the at least one criterion for advancing the counter, so that the shift register cycles between a certain sequence of states and satisfies the predetermined condition once it reaches a predetermined state within its cycle. For example the shift register could comprise a certain number of bits having a first value (0 or 1) and one bit having a second value (the other of 0 and 1), and could be considered to satisfy the predetermined condition once the single bit having a different value to all the other bits has been shifted into a particular position within the shift register, with the shift register being shifted by one position each time a memory access request meeting the advancement criteria is encountered. Of course, these are just some specific ways of implementing a test evaluating counter, and other options can also be used.

In general, by providing a test evaluating counter for evaluating the chance-dependent test, this can provide a simple method of implementing evaluation of a chance-dependent test. Whether the test evaluating counter meets the predetermined condition when a given memory access request is processed may be viewed as a matter of chance since it depends not on the properties of that particular memory access request, but also on apparently random occurrences such as the number of requests previously encountered and the relative ordering of memory access requests, which may typically be out of the control of the software issuing the memory access request, so that from the software's point of view whether the test evaluating counter satisfies the predetermined condition can be seen as an essentially random event providing a 1 in N chance of providing the first outcome, where N is the number of states which the test evaluating counter traverses between initialization and reaching the state in which the condition is satisfied.

In some examples, the test evaluating counter could be a global counter shared between all memory access requests, regardless of which page is accessed by the memory access request. This can be less costly to implement in terms of circuit area and power.

Alternatively, the test evaluating counter could be one of a number of local counters each for counting memory access requests of a specific subset, and the chance-dependent test performed when a given memory access request is processed may be based on the local counter which corresponds to the specific subset of memory access requests that includes the given memory access request. For example, different local counters could correspond to specific subsets of memory access requests associated with different operating modes or execution states (e.g. distinguishing privileged accesses from less privileged accesses, or distinguishing secure accesses from less secure accesses). Also it is possible to provide different local counters corresponding to loads and stores respectively, so that load requests (requesting transfer of data from memory to registers) and store requests (requesting transfer of data from registers to memory) have their chance-dependent test evaluated based on different counters. In another option, local counters may be provided corresponding to specific regions or pages of the memory address space, so that memory access requests to one region or page may have their chance-dependent test evaluated based on a different counter to memory access request targeting a different region or page. In the case of page-specific local counters, a convenient structure for tracking the local counters can be within a translation lookaside buffer (TLB) which stores address translation entries corresponding to respective pages, where the address translation entry for a given page may include the local counter corresponding to the given page. This can help to reduce circuit area and power consumption by avoiding the need for a further lookup to a separate structure, as an existing TLB lookup can be used to identify the local test evaluating counter for the current accessed page. Nevertheless, it would also be possible to implement a structure separate to the TLB for providing region/page-specific local test evaluating counters.

Providing separate local test evaluating counters specific to individual regions/pages of the memory address space can increase the accuracy of the access frequency tracking, so that the estimated access frequency represented by the access frequency tracking indicator for a given page can be more closely correlated with the actual number of accesses to that page, since it reduces the likelihood of false positives caused by an access to a region/page not previously accessed causing the first outcome of the chance-dependent test.

A test evaluating counter is not the only way of implementing the chance-dependent test. In another example the chance-dependent test may comprise determining whether a portion of bits has a predetermined value, where the portion of bits comprises bits sampled from one or more items of internal control information of the apparatus, or from a serial pulse train derived from one or more analog or digital signals of the apparatus. In some cases it may not be necessary to maintain any specific state (such as a counter) specifically for the implementation of the chance-dependent test, since there may be existing signals or information within the data processing apparatus (that have other purposes other than access frequency tracking) which could be sampled or reused to provide values which may vary approximately randomly according to some probability and so which could be sampled and compared with a predetermined value to determine whether the test is satisfied or not. For example, a processing apparatus may have internal counters for counting events such as elapsed clock cycles, cache misses or other events for performance monitoring, and some bits of those counters could be interpreted as a pulse train of evenly spaced events having a particular probability. In other examples a serial pulse train could be derived from multiple pieces of internal state or physical signals that may be substantially independent from each other but can be combined in a way that the resulting pulse train (sequence of bits sampled based on successive values of the state/signal over time) can be considered effectively random and then the access frequency tracking circuitry could evaluate whether those bits meet a certain condition (such as including a certain number of 1s in a row). It is not essential for digital signals to be used as the source of the pulse train. Analogue signals, such as a random bit stream from a diode or interference patterns between unrelated signals, could also be used. For example mixing (XOR) of two clock signals may give a beat frequency at the common factor of the respective clock frequencies and multiple such sources could be mixed to give a pulse train that is approximately random. Hence, there may be many options by which the sampled bits used to evaluate the chance-dependent test can be obtained, e.g. using existing analog or digital signals or information available within the processing apparatus.

In another example, the chance-dependent test may comprise determining whether a random or pseudorandom number has a predetermined value. Some systems may already have a random number generator or pseudorandom number generator for other purposes (such as encryption) and so that existing source of randomness could be exploited to provide a number of bits which may be compared with some predetermined value to determine whether the chance-dependent test provides the first outcome or a different outcome.

When the statistical approach using the chance-dependent test control whether to increment the counter is used, then on occasions when an increment is being performed either to the corresponding access frequency counter within the caching hardware structure or to a global access frequency counter in the global access frequency tracking data structure, the access frequency tracking circuitry may apply a scaling factor to the increment, where the scaling factor may be inversely proportional to the probability of the chance-dependent test providing the first outcome. For example, if the probability of the chance-dependent test providing the first outcome is 1/N, the increment to the corresponding access frequency counter could be by N in response to a single access to the corresponding page, or if the increment is being applied to the global access frequency counter then the increment size may be N times the value of the written back local access frequency counter. This recognises that if a chance-dependent test with probability 1/N is being applied then each increment to the counter effectively represents N times the number of accesses. By scaling the increments to either of the local or global counter in this way, this makes it possible for different sources of memory accesses which share a single global access frequency tracking data structure but implement different probabilities of the chance-dependent test (or for which only some of those sources apply the chance-dependent test), to maintain a shared global count which approximates the total number of accesses.

The scaling of the increment could be applied either on incrementing the corresponding access frequency counter or on incrementing the global access frequency counter. In the first approach, when the outcome of the chance-dependent test has the first outcome, the access frequency tracking circuitry may increment the corresponding access frequency counter by an increment amount inversely proportional to a probability of the chance-dependent test having the first outcome. In this case, a larger counter would be needed in the hardware caching structure than if the scaling of increments is applied on the writeback to the global structure, but it has an advantage that, for an implementation which support varying the probability of the chance-dependent test providing the first outcome (e.g. based on software configuring the probability to apply), then this may avoid needing to perform an additional writeback of the local counter when the probability changes.

On the other hand, with a second approach where the scaling is applied on writeback to the global structure, in response to a counter writeback event associated with a selected access frequency counter corresponding to a selected page of the memory address space, the access frequency tracking circuitry may cause at least one memory access request to be issued to the memory system to request an update to a global access frequency counter corresponding to the selected page within a global access frequency tracking data structure stored in the memory system, the update comprising incrementing the global access frequency counter by an increment amount which is proportional to a value of the selected access frequency counter and inversely proportional to a probability of the chance-dependent test having the first outcome. With this approach smaller counters can be used within the caching hardware structure as it is not necessary to upscale the increment amount inversely proportional to the probability, but if variable probability of the chance-dependent test giving the first outcome is supported then on a change to the probability it may be required to do an additional writeback of the counters to memory to ensure that the correct increment scaling amount based on the previous probability value is applied to the global structure before the probability is changed.

It is also possible to apply the chance-dependent test at the time of the counter writeback event. In this case, in response to the counter writeback event associated with the selected access frequency counter, the access frequency tracking circuitry: determines an outcome of a chance-dependent test, where the outcome of the chance-dependent test, when determined for the counter writeback event, is dependent on chance; when the outcome of the chance-dependent test is a first outcome, causes the at least one memory access request to be issued to the memory system to request the update to the global access frequency counter corresponding to the selected page; and when the outcome of the chance-dependent test is an outcome other than the first outcome, omits causing the at least one memory access request to issued to the memory system to request the update to the global access frequency counter corresponding to the selected page. This provides a further reduction in the memory overhead of accessing memory to update global access frequency counters (as global access frequency counter updates will be made less frequently), while still maintaining the global access frequency counters which are representative of the overall number of accesses to a given page.

Hence, a chance-dependent test could be applied either at the time of handling a given memory access request, when deciding whether to increment the local access frequency counter in the access frequency tracking structure, or at the time of handling a counter writeback event, when deciding whether to update the global access frequency counter in the memory system. It is also possible to implement both a first chance-dependent test when deciding whether to increment the local access frequency counter in response to a given memory access request, and a second chance-dependent test when deciding whether to update the global access frequency counter in response to a counter writeback event. In that case, the first and second chance-dependent tests could have the same probability of providing the first outcome, or could have different probabilities of providing the first outcome. Also, the first and second chance-dependent tests could use the same mechanism for evaluating the test (e.g. both using the same test evaluating counter or sampling from the same internal control information), or could use different mechanisms (e.g. any of the examples described above could be used).

The access frequency tracking circuitry and access frequency caching hardware structure could be implemented at different locations within a data processing system. In some cases the access frequency tracking circuitry, the memory access circuitry and the access frequency caching hardware structure may be provided within a processing element which also comprises processing circuitry to perform data processing in response to instructions defined according to an instruction set architecture (ISA). For example, the processing element may be a central processing unit (CPU) or graphics processing unit (GPU), which may be provided with the access frequency tracking circuitry.

In another example the apparatus may comprise an input/output memory management unit (IOMMU) which may perform memory management operations on behalf of a device having direct memory access to the memory system. The IOMMU could also be referred to as a "system memory management unit" (SMMU). The IOMMU may perform corresponding operations to those that would be performed by a memory management unit (MMU) within a processing element, but may do this on behalf of devices which have direct memory access to the memory system, where those devices may not themselves have processing circuitry capable of executing ISA-defined program instructions. The IOMMU may comprise the memory access circuitry, access frequency caching hardware structure, and the access frequency tracking circuitry as discussed above so that the frequency of accesses of memory access requests made from such devices can also be tracked.

In other examples, the access frequency tracking circuitry and access frequency caching hardware structure could be provided elsewhere in the memory system, e.g. at an interconnect, a system cache or a memory controller.

In some cases, a data processing system may comprise multiple sources of memory access requests (e.g. a plurality of processing elements, or at least one processing element and at least one IOMMU) at least two of which have the access frequency tracking circuitry and access frequency caching hardware structure. In that case, the respective access frequency tracking circuitry in the processing element(s) and/or the IOMMU could be configured to update the same global access frequency tracking structure in memory. Alternatively, the different sources of memory accesses could each update their own dedicated global access frequency tracking structures in memory, so that the frequency of accesses made by the devices are tracked separate from the frequency of accesses made by processing elements. The access frequency tracking circuitry may have access to a software-writable register which indicates a base address for the global access frequency tracking data structure, so that software can define the location of the global access frequency tracking data structure to which counter writebacks should be directed. Hence, whether different sources of memory access requests share the same global access frequency tracking data structure or use different global access frequency tracking data structures may depend on the base addresses selected by software to write to the registers of the respective access frequency tracking circuitry in the different memory system sources.

It will be appreciated that some systems may not have an IOMMU at all, or alternatively some systems even if they do have both the processing element and the IOMMU could only implement the access frequency tracking circuitry and access frequency caching hardware structure in one of the processing element and the IOMMU, so it is not essential for both to comprise the access frequency tracking circuitry.

Figure 1:
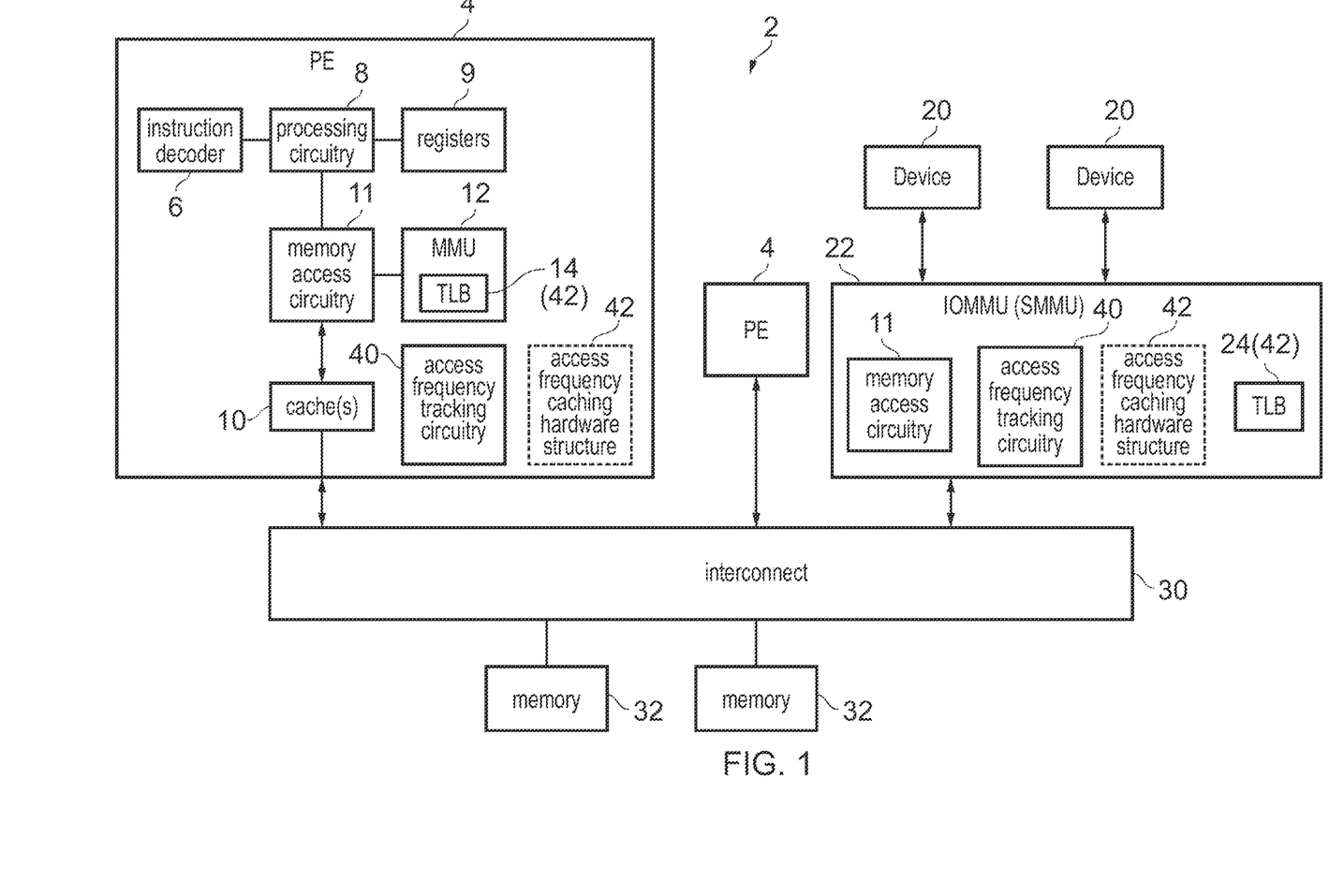
FIG. 1 schematically illustrates an example of a data processing system.

FIG. 1 schematically illustrates an example of a data processing system 2 having at least one processing element (PE) 4, e.g. a CPU (Central Processing Unit) or GPU (Graphics Processing Unit), which has an instruction decoder 6 for decoding program instructions and processing circuitry 8 which is controlled to perform processing operations in response to the instructions decoded by the instruction decoder 6. Registers 9 are provided to store data which can be used as operands by instructions executed by the processing circuitry 8. Results of operations performed by the processing circuitry 8 may be written back to the registers 9. The PE 4 has at least one cache 10 for caching data from memory for faster access by the CPU, memory access circuitry 11 for issuing memory access requests for accessing the memory system (including cache(s) 10 and main memory 32) in response to memory access instructions executed by the processing circuitry 8, and a memory management unit (MMU) 12 which functions as address translation circuitry for translating virtual addresses specified by instructions executed by the PE 4 into physical addresses identifying locations within the memory system. The MMU 12 may have at least one translation lookaside buffer (TLB) 14 for storing translation entries which depend on page table data from page table structures stored in the memory system. The page table structures define the address mappings between virtual and physical addresses and may also define memory access permissions which may define whether certain software processes executing on the PE 4 are allowed to access certain addresses. The MMU 12 may support 2-stage address translation where the mapping of a virtual address to a physical address depends on both stage 1 address translation data which maps the virtual address (VA) to an intermediate physical address (IPA) and stage 2 translation data which maps the IPA to a physical address (PA). The stage 1 address translation data may be set by an operating system or virtual machine. The stage 2 translation data may be set by a hypervisor.

The PE 4 is an example of a requester device which is capable of executing program instructions. FIG. 1 shows an example of a system with two such PEs 4, but clearly the number of PEs could vary. Some systems may only have a single PE, while others may have more than two. For conciseness, the internal components of the second PE 4 are not shown in FIG. 1, but it will be appreciated that the second PE 4 may also include the instruction decoder 6, processing circuitry 8, registers 9, cache(s) 10, memory access circuitry 11 and MMU 12. In some cases, the PEs 4 may be symmetric and may have the same design. It is also possible to include heterogeneous or asymmetric PEs 4 which have different components or for which the components such as the processing circuitry 8, cache(s) 10 etc. may have different micro-architectural implementations.

In addition to the PEs 4, the system may also include requester devices 20 which may not have an internal MMU, and so for accessing memory and providing address translation functionality, such devices may communicate with the rest of the system via an input/output memory management unit (IOMMU), also known as a system memory management unit (SMMU), 22. The IOMMU 22 includes address translation circuitry which controls address translation and memory permissions based on translation data defined in page table structures in memory. The IOMMU 22 may have one or more TLBs 24 which have a similar functionality to the TLBs 14 within the MMU 12 of the CPU 4. For example, a device 20 could include a display controller for controlling display of image frames on display, a network controller for controlling input or output of data via a network, a hardware accelerator for performing certain dedicated processing functions in a more efficient manner than can be achieved using software executing on a generic processor such as the CPU 4, and so on. The devices 20 have direct memory access to the memory 32, which means that they can issue access requests to request access to stored data directly, without needing to be explicitly programmed to do so by the PEs 4.

The requester devices 4, 20 communicate with each other via an interconnect 30 which is responsible for routing transactions between the requester devices and memory 32 and between respective requester devices. Interconnect 30 may also be responsible for managing coherency between data cached in respective caches 10 of the system. It will be appreciated that FIG. 1 is a simplified diagram and the system 2 may have many other components not shown in FIG. 1 for conciseness.

As shown in FIG. 1, the processing element 4 and/or the IOMMU 22 have access frequency tracking circuitry 40 for monitoring memory access requests made by the memory access circuitry 11, and for updating counters which track relative frequency of access for respective pages of the memory address space. The counters are stored in an access frequency caching hardware structure 42 which maintains a set of local access frequency counters for a subset of pages of the memory address space and is updated in hardware by the access frequency tracking circuitry 14. As shown in the dotted lines in FIG. 1, the access frequency caching hardware structure can in some cases be a standalone structure, separate from the TLB 14, 24 within the PE 4 or IOMMU 22. However, in some cases the TLB 14, 24 within the PE 4 or IOMMU 22 may also serve as the access frequency caching hardware structure 42.

One approach for page access frequency tracking is for a PE 4 or IOMMU 22 to maintain accessed/dirty flags on a per-page basis, setting a flag in a translation descriptor (page table entry) when a page is accessed or modified. The access flag can be used by operating systems to classify pages into "cold" or "hot" pages. For example, if a victim page needs to be selected for swap-out when memory is tight, the operating system (OS) may prefer to target a page that won't be used again soon, and can predict whether the page will be used again based on whether it has been used recently.

This area is getting particular attention because of new non-uniformities in the memory system. Some parts of memory may be faster (higher bandwidth or lower latency) than others due to memory technology or physical proximity to the processing element or accessing agent. NUMA (non-uniform memory access) migration or multi-tiered page migration is being actively researched: for example, monitoring access patterns so that frequently-accessed data can be copied to a page that is closer to an accessing agent. Detecting that pages are frequently-accessed is one portion of this (with the copy/move of data being a separate problem).

Two possible approaches to detect frequently-accessed pages are as follows: page protection and the per-page access flag. As a general procedure, a periodic software process samples whether pages have been accessed and amalgamates this information into a longer-term data structure (stored in memory and maintained by the software) which keeps count across several sampling periods. This data then gives a view of which pages have been accessed more frequently than others (for example, a software-maintained histogram/per-page counter shows the relative number of samples between pages). This software procedure can be used with the page access flag or page protection as follows:

Option 1—The access flag is cleared in all pages at the start of a sampling period. After a delay (periodic time, or at some interesting OS event) the page table is traversed and the access flag of each page observed. If the access flag is set, the software procedure updates the longer-term data structure (e.g. increments a counter corresponding to the page address) and clears the access flag. The process is repeated.

Option 2—Or, the permission attributes of pages are modified to make the pages inaccessible at the start of a sampling period. If that page is accessed, a page fault occurs; the page fault handler updates the longer-term data structure and makes the page accessible for a period of time. (This event may be used to trigger a different page to be protected/sampled.)

Option 1 has the disadvantage of being non-directed and requiring software to traverse the entire page table on the off chance of discovering a page has been marked accessed; even though this task can be performed on a different CPU to an application, it takes a very long time to traverse a large page table and wastes background CPU time.

Option 2 has the disadvantage of being high-overhead for the application if it is frequently interrupted by page faults, or of being inaccurate if it is interrupted rarely—this method wastes CPU time "inline".

Hence, capturing the access state of pages is (depending on mechanism) costly, but also unless it is sampled at an unfeasibly high rate, the access state is a poor proxy for ongoing page access frequency. It becomes difficult to differentiate a page that is accessed "sometimes" from a page that is very hot, without maintaining per-page counters, which are also spatially costly. As an example, a page accessed 100-1000 times/second might be considered "cold", compared to a page accessed 1 million times/second.

Figure 2:
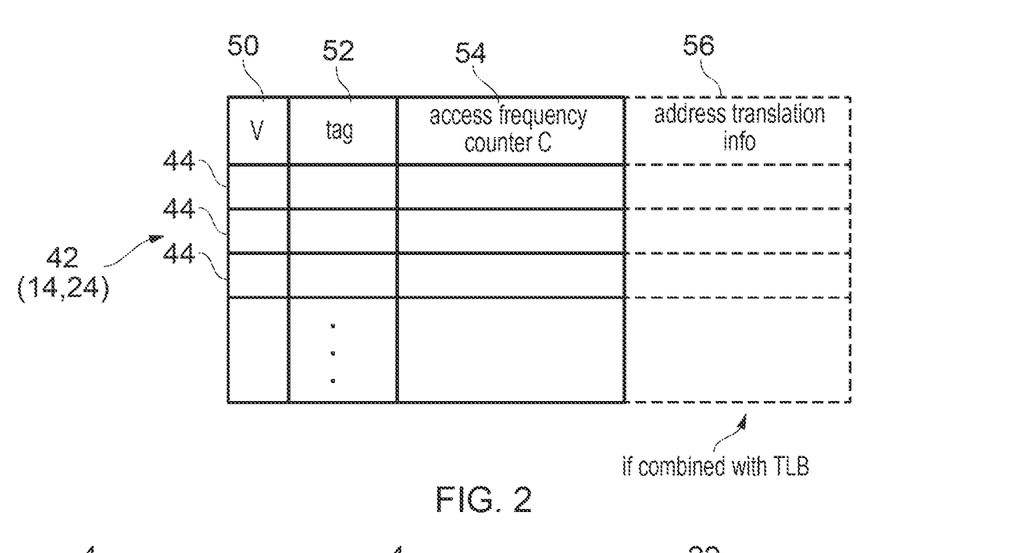
FIG. 2 illustrates an example of an access frequency caching hardware structure.

FIG. 2 shows an example of an access frequency caching structure 42, which can be used to address these problems. The structure includes a number of entries 44, which can be allocated by the access frequency tracking circuitry 40 to correspond to a particular page of the memory address space (more particularly, a particular page of a virtual address space—a virtual address may be used to identify the corresponding entry).

For example each entry 44 may specify a valid indicator 50 whether the entry is valid, a tag 52 which provides information (e.g. derived from a virtual address of the page) for identifying which page is represented by a particular entry 44, and an access frequency counter 54 which provides an indication of a relative frequency of accesses to the page corresponding to a particular entry 44. If the access frequency caching hardware structure 42 is combined with the TLB 14, 24 then each entry 44 may also specify address translation information 56, which is derived from a page table entry corresponding to the page identified by the tag 52. For example, the address translation information 56 may specify address translation mappings for translating virtual addresses to physical addresses and could also specify access permission information for determining whether an access to a given page is permitted from a given software process. Each entry 44 could also include other information not specified in FIG. 2. In embodiments where the access frequency caching hardware structure 42 is a standalone structure separate from the TLB then the address translation information 56 may be omitted.

Hence, by providing a caching hardware structure 42 for maintaining counters 54 in hardware, this means it is not necessary for memory bandwidth to be consumed on each memory access for incrementing a counter stored in the memory system and also the need for faults to allow software handlers to maintain a software-managed data structure in memory can be reduced, reducing the performance overhead of gaining relatively accurate information on the relative access frequency to different pages. When a target page is accessed by a particular memory access request then the access frequency tracking circuitry 40 may look up the (virtual) address of the target page in the access frequency caching hardware structure 42 and if there is a hit (i.e. there is a valid entry for which the tag 52 corresponds to the looked up address) then the corresponding access frequency counter 54 may be incremented. If there is a miss (none of the valid entries have a tag 52 corresponding to the looked up address) then a new entry can be allocated for the target page and if necessary an existing entry can be evicted to make way for the new entry.

Figure 3:
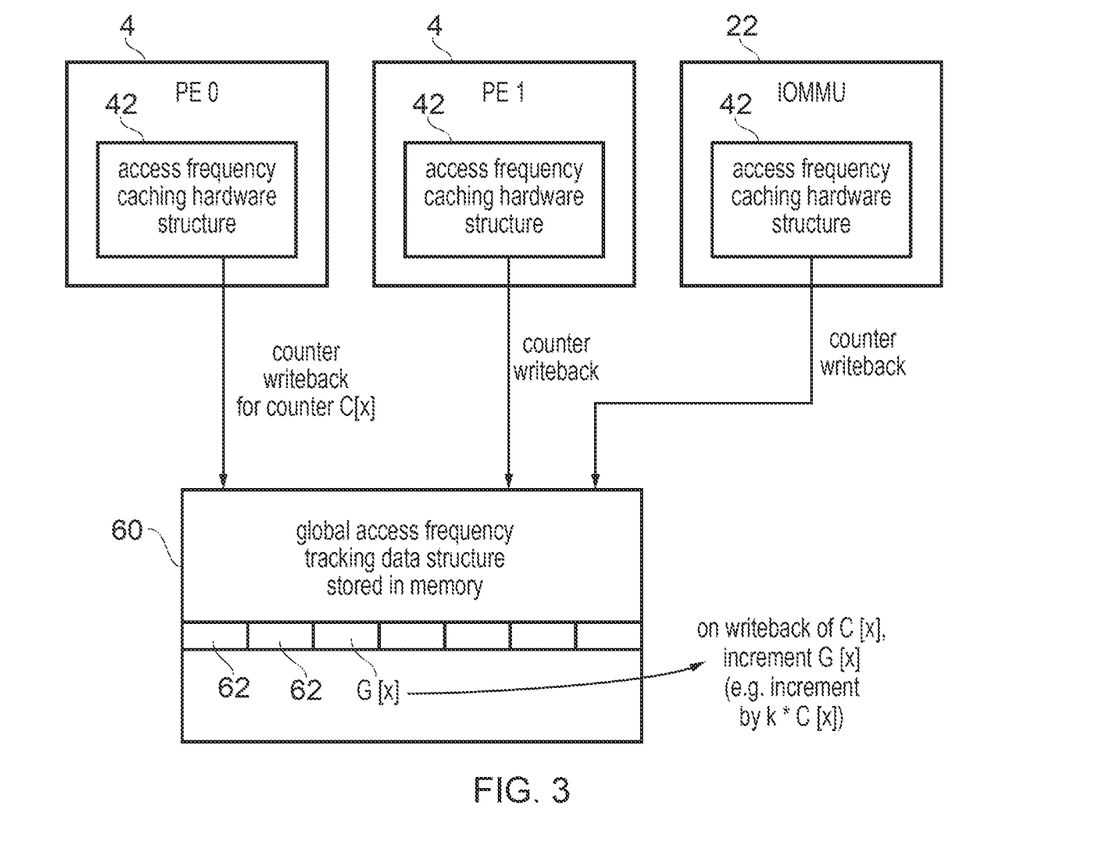
FIG. 3 illustrates how multiple sources of memory accesses sharing access to a memory system may each have access frequency caching hardware structures from which counters can be written back to a shared global access frequency tracking data structure stored in memory.

As shown in FIG. 3, a global access frequency tracking data structure 60 may be stored in the memory system to track global access frequency counters 62 for a larger number of pages than can be tracked in the access frequency caching hardware structure 42 within a given PE 4 or IOMMU 22. As shown in FIG. 3, multiple sources of memory access requests (e.g. different PEs 4 and/or an IOMMU 22) may share the same global access frequency tracking data structure 60. When a given memory access source 4, 22 encounters a counter writeback event for a selected counter C[x] corresponding to a given page x, then that counter value may be written back to the global access frequency tracking data structure in memory 60. When the counter writeback occurs for counter C[x], the corresponding global counter G[x] which corresponds to the selected page associated with the written back local counter C[x] being incremented by an increment amount which is proportional to the value of the local counter C[x], e.g. G[x]'=G[x]+k*C[x], where k is a scaling factor which could be 1 or could be greater than 1 (e.g. if a chance-dependent test is applied with probability 1/N as described earlier, the scaling factor k may equal N). Different sources 4, 22 of memory accesses may use different scaling factors k for the counter increment in the global access frequency tracking data structure, e.g. if they have different probabilities of incrementing their local counter 54 in the caching hardware structure 42 on a given memory access.

Hence, the global counters 62 track the total frequency of accesses encountered by the multiple sources of memory access requests as a whole with a global counter value corresponding (at least approximately) to the sum of the numbers of local accesses seen at each individual source 4, 22. By using an incrementing writeback operation (rather than a writeback where the global counter is set equal to the latest value of a written back local counter), there is no need to maintain coherency between different local counters maintained for the same page of the address space within the respective access frequency caching hardware structures of the different memory access sources 4, 22, reducing power and circuit area cost of managing coherency for the counters.

When a writeback operation is performed, the increment may be performed as an atomic increment so that the writeback operation is seen atomically by other observers to the address of the relevant global counter 62 in memory. For example an atomic read/modify/write operation may be used to read the old global count value G[x], modify it based on the value of the local counter C[x] being written back, and update the memory location storing the global counter to store the modified value of the global counter G'[x]. On writeback of a given local counter, the local count value 54 within the access frequency caching hardware structure of the PE 4 or IOMMU triggering the writeback may be reset to a reset value such as zero.

Figure 4:
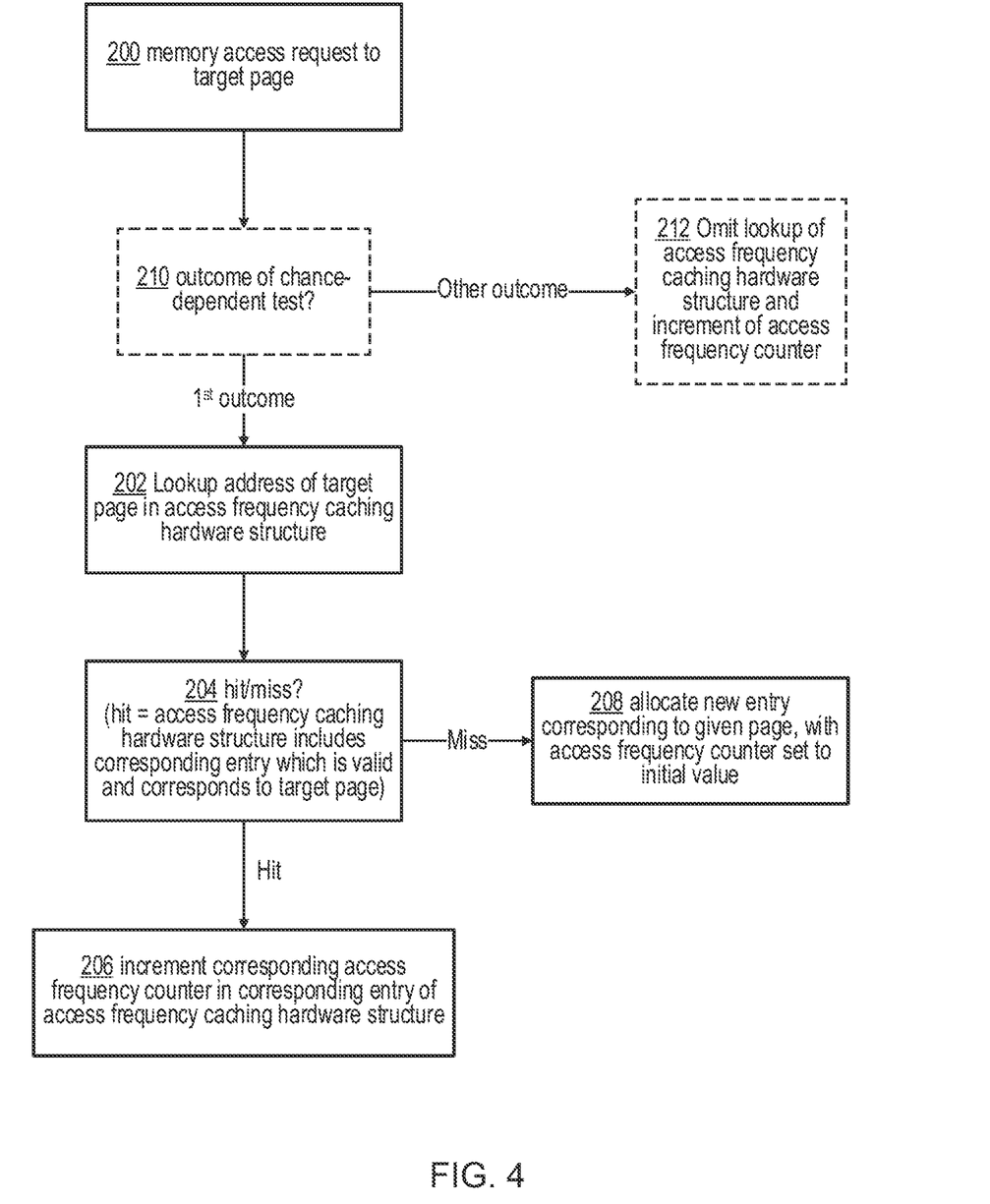
FIG. 4 is a flow diagram illustrating a method of tracking frequency of access to a given page of a memory address space.

FIG. 4 is a flow diagram illustrating tracking of access frequency by the access frequency tracking circuitry 40. At step 200 a memory access request to a target page of the address space is detected. In response, at step 202 the access frequency tracking circuitry 40 triggers a lookup of the address at the target page of the memory access request within the access frequency caching hardware structure. Different allocation schemes may be possible for the access frequency caching hardware structure 42, such as a fully-associative or set-associative structure, so the particular lookup process may depend on the organisation of the access frequency caching hardware structure 42. In general, a certain subset of entries 44 (or all of the entries in a fully-associative scheme) may have their tags 52 compared with information derived from the address of the target page, to determine whether there is a corresponding entry 44 in the access frequency caching hardware structure 42 which is valid and corresponds to the target page. Hence, at step 204, based on the lookup the access frequency tracking circuitry 40 determines whether the lookup hit or missed in the access frequency caching hardware structure. If there is a hit (the access frequency caching hardware structure 42 already includes a corresponding entry which is valid and corresponds to the target page) then at step 206 the access frequency tracking circuitry increments the corresponding access frequency counter within corresponding entry 44 of the access frequency caching hardware structure. If a miss was identified, then at step 208 a new entry is allocated in the access frequency caching hardware structure 42 corresponding to the target page, with the access frequency counter 54 of the new entry set to an initial value. For example the initial value could be 1. The new entry could be allocated to an invalid entry if one of the entries allowed to be allocated for the address of the target page is currently invalid, or alternative a victim entry already allocated for another address can be evicted and replaced, with a replacement policy such as least recently used, round robin, random, etc. used to select the victim entry.

FIG. 4 shows (in dotted lines) an optional feature which can be provided in some implementations. This option is not essential. If this option is implemented, then in response to the memory access request received at step 200, at step 210 the access frequency tracking circuitry 40 determines an outcome of a chance-dependent test, which is a test whose outcome depends on chance. As mentioned earlier, this can be implemented in different ways, such as by checking whether a test evaluating counter incremented per memory access has reached a certain value, or by sampling subsets of bits of state information within the data processing system, or by checking whether a random or pseudorandom number equals a certain value. If the outcome of the chance-dependent test is a first outcome (e.g. the test evaluating counter or sampled subset of bits matching a predetermined value) then the method proceeds to step 202 to perform the lookup of the access frequency caching hardware structure as mentioned earlier. However, if the outcome of the chance-dependent test is another outcome, other than the first outcome, then the lookup of the access frequency caching hardware structure is omitted at step 212 (therefore, even if the access frequency caching hardware structure does include a corresponding entry which is valid and corresponds to the target page, the access frequency counter in that entry would not be incremented).

Hence, with the second option, whether the counter corresponding to the accessed page is actually incremented or not may depend on whether a statistical test is satisfied, such as whether a random number has a certain value or whether a certain number of accesses have been encountered since the last time the test was satisfied, which may be essentially chance-dependent as the outcome for any given memory access may not be a deterministic property controllable by software. Software may be able to influence the probability of the outcome of the chance-dependent test giving the first outcome, but not influence whether the first outcome will occur for any particular memory access request. For example the software-configurable probability can control how many bits are used for a test evaluating counter (different from the access frequency counter 54) which counts memory accesses to determine whether the chance-dependent test is satisfied, or can control how many bits are sampled from state information or a random number used to evaluate the chance-dependent test. In general by applying a statistical test and only incrementing the counter on a fraction of accesses, this means that each increment the counter may effectively represent a certain number P of true accesses to memory corresponding, where 1/P is the probability of the chance-dependent test providing the first outcome, so that a smaller counter can be used to track a given range of true numbers of accesses. While there will be some imprecision in the counts maintained due to the effect of chance on whether a counter is actually incremented for a given access (it is possible with this approach that the counter may end up being incremented on the very first access to a given page due to the first outcome arising in a chance-dependent test, while a more frequently accessed page may keep "losing" the dice roll of the chance-dependent test so never have its access frequency counter incremented). However, on average the access frequency counters 54 will tend to be higher for the more frequently accessed pages compared to less frequently accessed pages to give useful information. In a case where the chance-dependent test is implemented at step 210 with probability 1/P of providing the first outcome, then the increment at step 206 could be scaled by P so that on each increment a larger number is added to the previous count value than if no chance-dependent test was applied, to reflect that each increment is likely to represent that a certain number of accesses have occurred to a given page. Alternatively the scaling of the counter increment could instead be applied at writeback at the point when the local counter is written to the memory based global access frequency tracking data structure 60.

FIG. 4 shows an approach where the chance-dependent test is evaluated at step 210 before deciding whether to lookup the access frequency caching hardware structure. This approach can save power by not incurring the power cost of the lookup if the chance-dependent test is failed.

However, another option would be that the lookup could be performed at step 202 before evaluating whether the chance-dependent test provides the first outcome. This could be used, for example, if the chance-dependent test depends on information in the corresponding entry of the access frequency caching hardware structure. For example, the probability 1/P of the chance-dependent test providing the first outcome could depend on the local access frequency counter stored in the corresponding entry of the access frequency caching hardware structure. Also, as mentioned above, it would be possible to implement page-specific test evaluating counters which could be stored in the access frequency caching hardware structure, so that the test at step 210 is evaluated based on the test evaluating counter stored in the corresponding entry of the access frequency caching hardware structure. Hence, if page-specific information is to be used for the chance-dependent test, the method of FIG. 4 may be reordered so that step 210 is performed after step 204 in cases where a hit is detected in the lookup, and if the outcome of the chance-dependent test is the first outcome, the method would then proceed to step 206 to increment the access frequency counter, while if the outcome is an outcome other than the first outcome, the increment of the access frequency counter in the corresponding entry at step 206 would be omitted.

Although not shown in FIG. 4, regardless of whether the optional chance-dependent test is implemented at step 210, additional filtering checks may be applied by the access frequency tracking circuitry 40 to determine whether a given memory access should trigger an increment of the corresponding counter. For example, at step 206 the access frequency tracking circuitry 40 may additionally check whether the memory access request meets certain filter criteria (which as described earlier could be based on the address of the memory access, based on context information such as ASID/VMID, based on the level of the memory hierarchy 10, 32 at which the access is serviced, and/or on the type of access (e.g. read or write)). If the filter criteria are satisfied then the increment may be applied at step 206 while the increment may be omitted in the case where the filter criteria are not satisfied.

Similarly, at step 208 it is possible that whether a new entry is allocated for the corresponding target page may depend on whether any filter criteria are satisfied (at least in implementations where the access frequency caching hardware structure is a standalone structure separate from the TLB 14, 24, since in case where the access frequency caching hardware structure 42 is shared with the TLB 14, 24 then it may be desired to allocate new entries into the TLB even when the access does not satisfy the filter criteria, so that address translation information 56 can still be allocated into the TLB 14, 24 for the target page).

In implementations where the access frequency caching hardware structure 42 is shared with the TLB 14, 24 and filtering is applied, then on allocating a new entry at step 208 the initial value of the access frequency counter 54 for the newly allocated entry could depend on whether the filter criteria are satisfied for the memory access request with, for example, the initial value being set to 0 if the filter criteria are not satisfied or set to 1 (or a value scaled based on the probability of the chance-dependent test if implemented) when the filter criteria are satisfied.

Such filtering is not essential and other examples may not apply any filtering.

Figure 5:
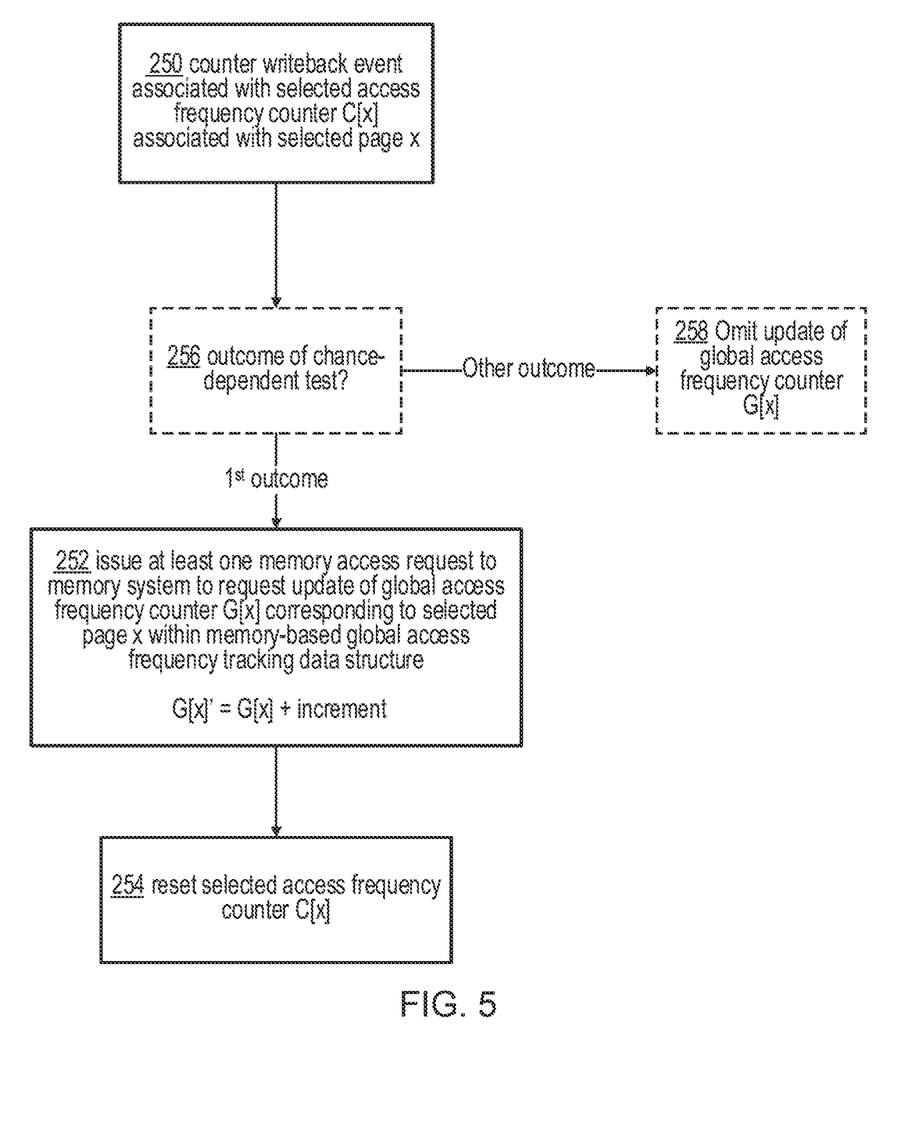
FIG. 5 illustrates updating of a global access frequency counter in response to a counter writeback event.

FIG. 5 is a flow diagram showing a method of processing counter writebacks from the access frequency caching hardware structure 42 to the global access frequency tracking data structure stored in memory. At step 250 a counter writeback event occurs associated with a selected access frequency counter C[x] which is associated with a selected page x of the address space. For example, a counter writeback event could be the eviction of an entry 44 for the selected page x from the access frequency caching hardware structure 42. Also the counter writeback event could be the access frequency counter 54 for the selected page x overflowing (for example to reduce the size of the entry 44, the access frequency counter 54 could have fewer bits than the corresponding global counter 62 maintained in memory, so from time to time the local counter may overflow and need a writeback to memory).

Another example of a counter writeback event (for some implementations) could be an occurrence of software changing the probability 1/P with which the chance-dependent test of step 210 provides the first outcome. To maintain a consistent view of the estimated total number of memory accesses to a given page represented by the global access frequency counters 62 when shared between different PEs 4 or IOMMUs 22, which could potentially implement different probabilities 1/P of the chance-dependent test (or may differ in whether a chance-dependent test is applied at all), some implementations may scale the increments to the global counters 62 by a factor P inversely proportional to the probability 1/P of the chance-dependent test providing the first outcome. However, this means that if software can vary the probability 1/P of the counter 54 being incremented on a given memory access (e.g. by writing to a register which controls the probability), then the amount by which the counter 62 is incremented on a counter writeback event should also vary. To avoid needing to record history information about past updates to the probability 1/P, it can be useful to trigger a counter writeback when the probability 1/P is changed by software, so that the counter writeback can be based on a scaling factor P corresponding to the old probability before the update, and then the probability can be updated and the local counters 44 reset, so that subsequent counter writeback events can use a scaling factor based on the new probability value without needing to determine previous history of setting the probability.

Another approach can be that to increase the utility to software which wishes to poll the frequency counts regularly, the instruction decoder 6 and processing circuitry 8 could support an invalidate instruction which can be used to force the local counters to be written back to update the global structure 60, and in this case the counter writeback event may be triggered for multiple different access frequency counters in response to execution of the access frequency count writeback instruction. Optionally this instruction could filter by address or context information or other parameters so that only the counters in entries 44 which meet the filter criteria are required to be written back, to reduce the memory bandwidth needed to handle counter writebacks. Another alternative for triggering counter writebacks could be that the counter writeback event could be the occurrence of a periodic flush event which may be used to periodically flush counters from the entries 44 of the access frequency caching hardware structure 42 to memory to ensure freshness of the global counts 62 in the global structure 60 stored in memory. This can be useful because, when there is a relatively high hit rate in the caching structure 42 (as is relatively likely when the cache is shared with the TLB for example), then evictions may not occur often and in the absence of another mechanism to trigger writebacks then this may make it harder for software to see the most up to date indication of relative access frequency. The periodic flush event may be triggered after an elapse of a certain number of processing cycles, after execution of a certain number of instructions or after a certain number of memory accesses, for example. The threshold number of cycles, instructions or memory accesses defined for triggering the flush event could be configurable by software. This approach of supporting periodic flush events could be either as an alternative to a counter invalidate instruction (also referred to as an access frequency count writeback instruction), or could be supported in combination with the invalidate instruction.

Hence, a number of options are available for triggering a counter writeback event. It will be appreciated that not all of these options need to be implemented in a particular implementation—any one or more of these counter writeback events could be supported. Regardless of the type of counter writeback event that occurred, at step 252, in response to the counter write back event associated with the selected access frequency counter C[x], the access frequency tracking circuitry 40 issues at least one memory access request (or causes the memory access circuitry 11 to issue such requests) to request an update of the global access frequency counter G[x] 62 which corresponds to the selected page x, with that global access frequency counter being updated within the memory-based global access frequency tracking data structure 60.

When the global access frequency counter is updated at step 252, this may be done by adding an increment value to the old value of the global access frequency counter G[x] to give the new value G[x]' corresponding to the sum of the old value and the increment. The increment can be proportional to the value of the written back counter C[x]. In some cases the increment can be equal to the value of the written back counter. Optionally, if the chance-dependent test is applied at step 210 of FIG. 4, then the increment can be inversely proportional to the probability of the chance-dependent test giving the first outcome. For example if the probability is 1/P then the increment could be P*C[x]. Alternatively if the scaling based on the probability is applied to the increment at step 206 of FIG. 4 then it is not necessary to also scale the increment when the write back to memory is performed and in this case the increment applied at step 252 could simply be the value of the written back local counter.

Also, in response to the counter write back event 250, once the value of the written back counter has been read to control issuing of the at least one memory access request, at step 254 the selected access frequency counter C[x] 54 corresponding to the selected page x is reset to a reset value, for example 0. This ensures that on subsequent writeback events for the same counter C[x], the previously counted accesses are not counted twice when applying the increment to the global access counter 62.

As shown in the dotted boxes 256, 258 in FIG. 5, some examples may also implement a chance-dependent test in deciding whether, in response to a counter writeback event for local access frequency counter C[x], the corresponding global access frequency counter G[x] should be updated. In this case, in response to the counter writeback event at step 250, at step 256 the chance-dependent test is evaluated and it is determined whether the outcome is the first outcome. The chance-dependent test could be implemented according to any of the examples discussed above, e.g. using a test evaluating counter, bits sampled from internal control information, or a random or pseudorandom number. In some cases, the chance-dependent test could be independent of the value of the selected access frequency counter C[x]. However, it is also possible that the value of the selected access frequency counter C[x] may be used to determine whether the outcome of the chance-dependent test is satisfied. For example, the probability of the chance-dependent test could be scaled based on the value of the selected access frequency counter C[x].

If at step 256 the chance-dependent test is determined to provide the first outcome, the method proceeds to step 252 to issue the at least one memory access request to request the update of the global access frequency counter G[x] as described earlier. If the chance-dependent test is determined at step 256 to provide an outcome other than the first outcome, then at step 258 the update of the global access frequency counter G[x] is omitted. By reducing the frequency of global access frequency counter updates, this can further reduce the overhead of global counter updates while providing a global counter that is representative of the actual number of accesses.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
memory access circuitry to process memory access requests requesting access to a memory system;
an access frequency caching hardware structure, comprising a plurality of entries each to store an access frequency counter indicative of a frequency of accesses to a corresponding page of a memory address space; and
access frequency tracking circuitry responsive to a given memory access request requesting access to a target page of a memory address space, to:
determine whether the access frequency caching hardware structure already includes a corresponding entry which is valid and corresponds to the target page; and
when the access frequency caching hardware structure already includes the corresponding entry, increment a corresponding access frequency counter specified by the corresponding entry;
in which:
in response to a counter writeback event associated with a selected access frequency counter corresponding to a selected page of the memory address space, the access frequency tracking circuitry is configured to cause at least one memory access request to be issued to the memory system to request an update to a global access frequency counter corresponding to the selected page within a global access frequency tracking data structure stored in the memory system.

2. The apparatus according to claim 1, in which the access frequency caching hardware structure is a translation lookaside buffer, and the plurality of entries are translation lookaside buffer entries each to store the access frequency counter and address translation information associated with the corresponding page.

3. The apparatus according to claim 1, in which the access frequency counter comprises a plurality of bits having an encoding capable of distinguishing a first frequency of accesses greater than zero from a second frequency of accesses greater than zero.

4. The apparatus according to claim 1, in which the access frequency tracking circuitry is configured to filter which memory access requests trigger incrementing of the corresponding access frequency counter, based on at least one filter criterion.

5. The apparatus according to claim 1, in which the update to the global access frequency counter comprises incrementing the global access frequency counter by an increment amount.

6. The apparatus according to claim 5, in which the increment amount depends on a value of the selected access frequency counter.

7. The apparatus according to claim 1, in which in response to the counter writeback event, the access frequency tracking circuitry is configured to reset the selected access frequency counter stored in the access frequency caching hardware structure.

8. The apparatus according to claim 1, in which the selected access frequency counter has fewer bits than the global access frequency counter.

9. The apparatus according to claim 1, in which the counter writeback event comprises at least one of:
eviction of an entry corresponding to the selected page from the access frequency caching hardware structure; and
the selected access frequency counter overflowing or reaching a predetermined threshold value.

10. The apparatus according to claim 1, in which, in response to elapse of a predetermined period, the access frequency tracking circuitry is configured to trigger the counter writeback event associated with a plurality of access frequency counters stored in the access frequency caching hardware structure.

11. The apparatus according to claim 1, in which the counter writeback event comprises execution of an access frequency count writeback instruction.

12. The apparatus according to claim 11, in which the access frequency count writeback instruction specifies at least one filter criterion, and in response to execution of the access frequency count writeback instruction, the access frequency tracking circuitry is configured to trigger the counter writeback event associated with one or more access frequency counters for which the at least one filter criterion is satisfied.

13. The apparatus according to claim 1, comprising a plurality of sources of memory accesses sharing access to the memory system, at least two of the sources of memory accesses having the memory access circuitry, the access frequency caching hardware structure and the access frequency tracking circuitry; in which:
the at least two sources of memory accesses are each configured to update the global access frequency tracking data structure, based on the access frequency counters stored in the respective access frequency caching hardware structure of each of the at least two sources.

14. The apparatus according to claim 1, in which in response to the given memory access request, when the access frequency caching hardware structure already includes the corresponding entry, the access frequency tracking circuitry is configured to:
determine an outcome of a chance-dependent test, where the outcome of the chance-dependent test, when determined for the given memory access request, is dependent on chance;
when the outcome of the chance-dependent test is a first outcome, increment the corresponding access frequency counter; and
when the outcome of the chance-dependent test is an outcome other than the first outcome, omit incrementing of the corresponding access frequency counter.

15. The apparatus according to claim 14, in which the access frequency tracking circuitry is configured to apply a scaling factor to an increment to the corresponding access frequency counter or an increment to the global access frequency counter in the global access frequency tracking data structure, where the scaling factor is inversely proportional to a probability of the chance-dependent test providing the first outcome.

16. The apparatus according to claim 1, in which in response to the counter writeback event associated with the selected access frequency counter, the access frequency tracking circuitry is configured to:
determine an outcome of a chance-dependent test, where the outcome of the chance-dependent test, when determined for the counter writeback event, is dependent on chance;
when the outcome of the chance-dependent test is a first outcome, cause the at least one memory access request to be issued to the memory system to request the update to the global access frequency counter corresponding to the selected page; and
when the outcome of the chance-dependent test is an outcome other than the first outcome, omit causing the at least one memory access request to issued to the memory system to request the update to the global access frequency counter corresponding to the selected page.

17. The apparatus according to claim 1, comprising a processing element comprising:
processing circuitry to perform data processing in response to instructions defined according to an instruction set architecture;
the memory access circuitry;
the access frequency caching hardware structure; and
the access frequency tracking circuitry.

18. The apparatus according to claim 1, comprising an input/output memory management unit to perform memory management operations on behalf of at least one device having direct memory access to the memory system;
the input/output memory management unit comprising the memory access circuitry, the access frequency caching hardware structure, and the access frequency tracking circuitry.

19. A method for tracking frequency of access to one or more pages of a memory address space, the method comprising:
in response to a given memory access request requesting access to a target page of the memory address space:
determining whether a corresponding entry which is valid and corresponds to the target page is present in an access frequency caching hardware structure comprising a plurality of entries each to store an access frequency counter indicative of a frequency of accesses to a corresponding page of a memory address space; and
when the access frequency caching hardware structure already includes the corresponding entry, incrementing a corresponding access frequency counter specified by the corresponding entry; and
in response to a counter writeback event associated with a selected access frequency counter corresponding to a selected page of the memory address space, issuing at least one memory access request to the memory system to request an update to a global access frequency counter corresponding to the selected page within a global access frequency tracking data structure stored in the memory system.

20. A non-transitory computer-readable medium to store computer-readable code for fabrication of an apparatus comprising:
memory access circuitry to process memory access requests requesting access to a memory system;
an access frequency caching hardware structure, comprising a plurality of entries each to store an access frequency counter indicative of a frequency of accesses to a corresponding page of a memory address space; and
access frequency tracking circuitry responsive to a given memory access request requesting access to a target page of a memory address space, to:
determine whether the access frequency caching hardware structure already includes a corresponding entry which is valid and corresponds to the target page; and
when the access frequency caching hardware structure already includes the corresponding entry, increment a corresponding access frequency counter specified by the corresponding entry;
in which:
in response to a counter writeback event associated with a selected access frequency counter corresponding to a selected page of the memory address space, the access frequency tracking circuitry is configured to cause at least one memory access request to be issued to the memory system to request an update to a global access frequency counter corresponding to the selected page within a global access frequency tracking data structure stored in the memory system.

* * * * *